United States Patent Office 3,094,419
Patented June 18, 1963

3,094,419
LIQUID FOOD TREATING PROCESS
Leon Singer, St. Paul, and Wallace D. Armstrong, Minneapolis, Minn., assignors to The Regents of the University of Minnesota, Minneapolis, Minn., a corporation of Minnesota
No Drawing. Filed Dec. 21, 1959, Ser. No. 860,725
11 Claims. (Cl. 99—60)

This invention relates to methods for the removal of radioactive isotopes from milk and other liquid foods. For the past several years, the accumulation of fallout and, particularly, the deposition of radioisotopes of strontium has been observed and documented in relation to the accumulation of the isotope in soil, the contamination of foods and deposition in the skeleton of man. Although it has been observed that deposition of fallout has been global, the pattern of fallout has varied with maximum deposition occurring in the North temperate zone.

Radiostrontium is deposited in the skeleton directly in the formation of new bone and through exchange and other turnover processes in pre-existing bone. Milk, in all of its forms, is an important source of calcium, particularly among children. In the United States and other western countries, it is estimated that at least half of the calcium deposited in the skeletons of human beings through adolescence originates from dairy products. Milk becomes contaminated from the radiostrontium in the soil from which the cows' forage is grown. It has been shown that skeletons formed from milk diets contain about one half the strontium-calcium ratio of the original milk.

Whether the current levels of radiostrontium in milk constitute any health hazard is a disputed issue among scientists. There is the possibility, as a result of an accident or of premeditated design, the occasion may arise when it may be necessary, in order to have the continued use of milk as the chief source of calcium in our diet, that a method be available for the removal of radio elements. Until the ultimate effects of radioisotopes on the body and the tolerances of the body for them can be determined with certainty, it is desirable that ingestion of these materials be minimized.

It is the principal object of this invention, therefore, to provide methods for the removal of radioactive isotopes from milk and other liquid foods.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The present invention is based upon the discovery that radiocations may be removed from milk by a heteroionic exchange between the radioactive material and bone in original or modified form or certain calcium-containing minerals, such as crandallite and natural and synthetic apatites. It has been discovered that cationic radioisotopes, such as, for example, those of strontium, can be removed from whole milk, homogenized whole milk, skim milk, etc. by contacting the liquid with the solid mineral exchanger material. Each of the usable mineral materials is a calcium base substance which is virtually insoluble. The mineral exchanger materials have the virtue of being inexpensive and readily available.

Contact between the liquids and exchanger mineral may be by percolation by gravity or by pressure through a column or bed of the solid mineral material; by agitation of the mineral material with the liquid followed by removal of the mineral by centrifugation, settling or filtration; by suspension of a porous container of the mineral material in a volume of the liquid with or without agitation; and like methods. Milk may be treated before or after pasteurization. Previously dried milk may be treated after reconstitution. The taste of the milk is not materially altered by the treatment and apart from substantial reduction in the concentration of radioisotopes, the composition of the milk is not materially changed.

Exemplary minerals of the apatite class which have been demonstrated to be effective in the removal of radioisotopes from milk include each of the following:

Anorganic bone (animal bone which has been treated with ethylene diamine to remove protein)
Protein-free bone (prepared by treating animal bone with potassium hydroxide in boiling ethylene glycol)
Dry fat-free bone
Ashed bone
Apatites (calcium fluophosphate and calcium chlorophosphate) in either their natural or synthetic forms
Crandallite (calcium aluminum phosphate)
Dibasic calcium phosphate
Tertiary calcium phosphate
Calcium sulfate
Tennessee rock phosphate (calcium phosphate, usually together with calcium carbonate and other minerals)
Dry fat-free bone pretreated with potassium hydroxide and calcium chloride
Steamed bone The radioisotope contaminated liquid is contacted with the exchanger mineral in a finely divided state. Mesh sizes of minerals have been employed ranging from all less than 40 mesh to all greater than 100 mesh, i.e., 100–200 mesh. It has been determined that greater radioactivity removal efficiency is obtained with the use of the more finely divided material. Where the contact between the liquid and solid mineral is by agitation, such as shaking or stirring, the finer mesh sizes, such as all greater than about 80 mesh, are preferred. However, where the liquid is percolated through the mineral exchange material, larger particle sizes in the range between about 40–80 mesh are preferred in order to accelerate the rate of flow.

Where contact between the liquid and solid mineral is by suspension of the solid in the liquid, weight/volume (gm./ml.) ratios of between about 1 to 2½ and 1 to 100 have been utilized. Efficient removal of radioactive contaminants has been obtained at weight/volume ratios between about 1 to 2½ and 1 to 50 and this is therefore the preferred weight/volume range. It will be understood that ease of agitation and separation of the solid mineral from the liquid is greater where there is a lesser weight of mineral per volume of liquid. For this reason, the greater efficiency of the higher proportions of solids may often be overbalanced by the greater ease of agitation and separation of the lower proportions of solids. It will be understood that where the liquid is percolated through a column of the solid mineral, the weight/volume ratio may be greater than 1 to 1 at any given time. However, considering the volume of liquid passed through the column, the effective weight/volume ratio may well substantially exceed 1 to 100.

Contact times between the radioisotope contaminated liquid and the solid mineral has varied from a few minutes to 24 hours. When weight/volume ratios within the preferred ranges are used, no appreciable advantage is obtained from prolonged contact. As the liquid volume increases relative to solid mineral present, time of contact becomes more important. Within the preferred range of concentrations contact times of from about 30 minutes to 2 hours are adequate to accomplish substantial reduction in activity. It will be understood that additional prolonged contact time will not produce commensurate reduction in activity, but may be practicable where the treatment may be carried out without unduly monopolizing the use of equipment as, for example, when it is held overnight.

Contact between liquid and solid mineral material is promoted, along with a consequent increase in efficiency of removal of activity, by agitation of the mixture. Agitation may be by any conventional means, such as stirring, shaking, gas bubbling and the like. The amount of activity removed increases with prolongation of the time of agitation, but at a decreasing rate. Removal is greatest during the first 5 to 15 minutes of agitation. Thereafter, the rate of removal diminishes to such an extent that prolonged agitation becomes less economically feasible. It will be understood that, as in the case of total contact time, the agitating time may be extended but with ever decreasing loss of efficiency per unit of time. However, where it is feasible to hold milk in contact with mineral overnight, for example, it would be equally feasible to subject it to mild agitation during that period. Stirring is a preferred form of agitation and produces better results than shaking or air bubbling.

To facilitate removal of the solid mineral material, the mixture is preferably permitted to stand for a period of time after agitation is stopped to permit settling of the solid mineral. As an example, where total contact time is of the order of 1 hour, the time of agitation may vary between about 5 and 15 minutes.

Where contact between the liquid being treated and the solid mineral takes place in a column, either by gravity or applied pressure, each volume unit of liquid contacts a relatively high proportion of the solid mineral so that the effect, as regards thorough contact between liquid and solid, is comparable to that obtained by agitation.

The influence of temperature on the mechanisms affecting removal of radiostrontium from liquids appears to be minimal. Treatments have been carried out with milk at temperatures between about 5° and 85° C. without appreciable differences in result attributable to temperature variations. Where ashed bone is used as the mineral exchange material, it has been determined that the temperature at which the bone was ashed affects its ability to remove radiostrontium from milk. Thus, it was found that for all mesh sizes bone ashed at 500° C. is more effective than bone ashed at 600° C., which in turn is more effective than bone ashed at 700° C. Similarly, it has been found that anorganic bone subjected to 600° C. treatment has reduced capacity for removal of radiostrontium as compared to that heated to only 200° C.

It has been found that fat-free bone may be considerably activated by pretreatment with a solution of potassium hydroxide. Both fat-free bone and anorganic bone may be regenerated or reactivated by contact with potassium hydroxide solution. Where the mineral material is used in a column, the alkali solution has been merely passed through the column which has been washed out until the column washings are at neutral pH. A column of fat-free bone activated by pre-treatment with potassium hydroxide solution has been regenerated with a solution of calcium chloride with good effect. The same column was then re-regenerated with a combination treatment of calcium chloride followed by potassium hydroxide and in its third run was more effective in removing radiostrontium than initially. The same column was again regenerated with calcium chloride solution followed by potassium hydroxide solution and in its fourth run its efficiency was substantially undiminished and remained higher than that initially possessed.

The invention is further illustrated by the following examples. In each of the examples, radioactivity was counted by a crystal scintillation counter. Radiostrontium was added to each sample in the form of an aqueous solution of radioactive strontium chloride to raise the radioactivity of the liquid sample to a predetermined number of counts per volume per unit of time. The reduction in radioactivity after treatment of the liquid was determined by measurement of counts per same unit of volume per same unit of time.

*Example I*

The effectiveness of anorganic bone in removing radiostrontium from milk was determined at each of several mesh sizes. In each instance two parts by weight of bone were mixed wtih 25 parts of radiostrontium milk. The mixture was shaken at slow speed for 10 minutes and then placed in a refrigerator for 40 minutes to permit the bone to settle. The milk was then filtered through black ribbon paper and analyzed. The results expressed in percent of activity removed for each of the mesh sizes are as follows:

| | Percent |
|---|---|
| Less than 40 mesh | 60.4 |
| 40–60 mesh | 69.7 |
| 60–80 mesh | 71.2 |
| 80–100 mesh | 75.5 |
| Greater than 100 mesh | 90.0 |

*Example II*

The effectiveness of KOH-glycol ashed bovine bone was similarly determined. Two parts by weight of bone were mixed with 25 parts of milk, shaken for 10 minutes, refrigerated for 40 minutes, filtered and analyzed. The results expressed in percentage of activity removed are as follows:

| | Percent |
|---|---|
| 40–60 mesh | 66.4 |
| 60–80 mesh | 71.8 |
| 80–100 mesh | 88.0 |
| Greater than 100 mesh | 93.1 |

*Example III*

The effectiveness of tertiary calcium phosphate for the removal of radioactive isotopes was determined by mixing one part by weight of the phosphate (of particle size greater than 100 mesh size) with 20 parts of radiostrontium milk. The mixture was shaken for 10 minutes, allowed to stand for 50 minutes to settle and then filtered and analyzed. It was determined that 58.3% of the activity was removed by this treatment.

*Example IV*

The mineral crandallite was used as a radioisotope absorber. Two parts by weight of the mineral were mixed with 25 parts of radiostrontium milk, shaken for 10 minutes, refrigerated for 40 minutes, filtered and analyzed. The mineral particle size was greater than 100 mesh. It was determined that 21.2% of the radioactivity in the milk was removed. Two parts by weight of another sample of crandallite were mixed with 50 parts of radiostrontium milk and heated for 20 minutes to 85° C. without further agitation. The mixture was filtered and analyzed and it was determined that 20.4% of the activity had been removed.

*Example V*

Bovine ashed bone in the amount of 10 parts by weight was mixed with 25 parts of radiostrontium milk and shaken for 5 minutes. The bone had a particle size greater than 100 mesh. After shaking, the mixture was permitted to stand for 30 minutes and then filtered through paper. Analysis revealed 51.8% of activity removed. The same treatment was repeated with the exception that 3 parts by weight of ashed bone was admixed with 25 parts of radiostrontium milk. Analysis of the filtrate showed 48.4% of activity removed.

*Example VI*

Fat-free bone was used as an absorber of radioactivity. In these treatments bone of particle size greater than 100 mesh was used. One part by weight of fat-free bone was mixed with 50 parts of radiostrontium milk. The mixture was agitated by stirring for 10 minutes. After settling, the mixture was filtered and, upon analysis, revealed that only 9.7% of the activity had been removed from the milk. The treatment was repeated using a different sample of the same fat-free bone pretreated by suspension in a 1 N solution of potassium hydroxide for 30 minutes, followed by filtering and washing with water to neutral pH. Upon analysis of the milk sample treated with this activated fat-free bone, it was determined that 28.9% of the activity had been removed. The treatment was then repeated in all respects except that the fat-free bone was activated by suspension in an 8 N solution of potassium hydroxide. Analysis of the milk treated with this material showed removal of 55.7% of activity. Another sample of fat-free bone was activated by pretreatment by boiling for 5 minutes in an 8 N KOH solution, standing for 48 hours, filtering and washing to neutral pH. One part by weight of this activated fat-free bone was admixed with 25 parts of radiostrontium milk, stirred for 10 minutes, permitted to settle and then filtered. Analysis of the filtrate revealed removal of 73.6% of the activity from the treated milk.

*Example VII*

Radiostrontium milk was treated with L-apatite. One part by weight of the mineral was admixed with 50 parts of liquid. The mixture was agitated by stirring with a magnetic stirrer for 10 minutes and after settling for 50 minutes was filtered and the milk was analyzed. Analysis showed removal of 27.6% of activity. This treatment was repeated in all respects except that agitation was by shaking for 10 minutes. Upon analysis, it was shown that 33.3% of activity was removed.

*Example VIII*

One part by weight of hydroxylapatite was mixed with 50 parts of radiostrontium milk. The mixture was stirred for 10 minutes, permitted to settle, filtered and analyzed. Analysis showed 25.9% of activity removed. The same treatment was repeated in all respects except that agitation was by shaking for 10 minutes instead of stirring. Analysis of this treated milk showed removal of 20.2% of radioactivity.

*Example IX*

Milk was treated with dibasic calcium phosphate to reduce the radiostrontium level. One part by weight of calcium phosphate was admixed with 20 parts milk. This was shaken for 10 minutes, allowed to settle for 50 minutes, filtered and analyzed. It was found that the activity level had been reduced by 10.2.%

*Example X*

Milk was treated with calcium sulfate to reduce the radioactivity concentration. One part by weight of calcium sulfate was mixed with 60 parts of radiostrontium milk. The mixture was shaken for 10 minutes and allowed to settle for 18 hours. At the end of that time it was filtered. Analysis of the milk showed reduction in activity level of 6.9%.

*Example XI*

The effect of giving milk two treatments with a modified bone was observed in one series of treatments. In each of four separate treatments, one part by weight of modified bone was agitated for 10 minutes with 25 parts of radiostrontium milk. The absorber material was permitted to settle. The mixture was filtered and the milk was analyzed with the following results in terms of percentage of activity removed:

|  | Percent |
|---|---|
| Anorganic (femur head) | 78.5 |
| Anorganic (femur shaft) | 78.4 |
| Ashed (700° C.) | 33.2 |
| KOH-glycol ashed | 79.4 |

Each of the milk samples was then subjected to retreatment with different samples of the same absorber materials under the same conditions with the following results, expressed in terms of percentage of remaining activity removed, from the second treatment:

|  | Percent |
|---|---|
| Anorganic (femur head) | 69.5 |
| Anorganic (femur shaft) | 69.4 |
| Ashed (700° C.) | 29.4 |
| KOH-glycol ashed | 72.2 |

As part of the same series of treatments, several samples of modified bone, which had been used once to treat radiostrontium milk, were used for a second run without any attempt to regenerate or reactivate them. Radiostrontium milk was treated with this reused bone material in the same proportions and under the same conditions as the other treatments in this series with the following results expressed as percentage of activity removed:

|  | Percent |
|---|---|
| Anorganic (femur head) | 47.2 |
| Anorganic (femur shaft) | 50.7 |
| Ashed (700° C.) | 18.6 |
| KOH-glycol ashed | 57.5 |

*Example XII*

The so-called "tea bag" method of treatment is illustrated by the following. Two parts by weight of 40–60 mesh anorganic-bone were placed in a small bag made of porous and wettable paper constructed to resemble a tea bag. The bag containing the solid mineral substance was agitated briefly in 50 parts of radiostrontium milk, left for 25 minutes and then removed. It was found that this treatment removed 34% of the strontium activity from the milk.

*Example XIII*

Larger volumes of milk were reated in an absorption column. The columns used were about 11 to 12 units long with an internal diameter of about 1 unit and adapted to contain 8 to 9 parts by weight of 40–60 mesh modified bone. A total of 200 parts of radiostrontium milk was permitted to flow by gravity through each of he columns in increments of 25 parts of milk and at a rate of flow of about 12 parts milk every 4 minutes. For purposes of analysis, the reduction in strontium activity was counted for each 25 part sample of milk. When KOH-glycol bone was used as the absorber material, 97.6% activity was removed from the first 25 part sample of milk, 77.3% activity was removed from the last 25 part fraction and the total percentage of activity removed from the composite 200 part sample was 86.4%. Similarly, when using anorganic bone as the absorber material, 95% activity was removed from the first 25 part sample, 57% was removed from the last 25 part sample and a total of 86.2% activity was removed from the composite 200 part milk sample.

*Example XIV*

Two samples of 840 parts of radiostrontium milk were passed through absorption columns containing 9.9 parts by weight of KOH-glycol bone and 9.8 grams ossar femur bone, respectively. The particle size of the bone in each instance was 40–60 mesh. The milk sample was passed through the columns by gravity flow in portions of 12 parts each. In the case of the KOH-glycol bone column, 88% of the strontium activity was removed from the first 12 part portion; 25.8% activity was removed from the seventieth 12 part portion and a total of 46.2% activity was removed from the total 840 part sample. In the case of the ossar femur bone column, 91.6% strontium activity was removed from the first 12 part portion; 14.5% activity was removed from the last 12 part portion to effect a total removal of 43.4% from the composite 840 part sample. The rate of flow in both instances was about 12 parts milk every 4 minutes.

The ossar femur anorganic bone column was regenerated by passing 50 parts of a 3 N potassium hydroxide solution through the column and washing with water to neutral pH. A further 840 part sample of radiostrontium milk in 12 part units was passed through the regenerated column. A total of 74.7% of strontium activity was removed from the first 12 part unit and 15.2% activity was removed from the last 12 part unit to give a total removal of 34.4% from the composite 840 part sample. The alkali and washings used to regenerate the anorganic column which was then reused were counted and it was found that they did not contain any activity. Thus, it is established that the radiostrontium removed from the first run of milk through the column is fixed in the mineral in the column.

*Example XV*

Further milk was treated similarly to the last two previous examples, but in an absorption column about 3 times as long. This column had a length of 35 units and an inside diameter of 1.2 units and was capable of receiving 31.8 parts by weight of 40–60 mesh size anorganic bone. For purposes of analysis, the milk was collected in 15 part samples. A total of 915 parts of radiostrontium milk was passed through the column. A total of 94.5% strontium activity was removed from the first 15 part sample. Strontium activity removed from the 61st and last 15 part sample was 61%. The total activity removed for the composite 915 part milk sample was 79.1%.

*Example XVI*

Fat-free bone similar to that of Example VI was used to treat milk in absorber columns as described in Examples XIII and XIV. Nine to 10 parts by weight of 40–60 mesh fat-free bone was packed in the columns. One column contained untreated fat-free bone. The other column contained fat-free bone which had been pretreated by contact with 3 N potassium hydroxide solution. A total of 950 parts of radiostrontium milk was passed through each of the columns. Only 9% strontium activity was removed from the total volume of milk passed through the column of untreated fat-free bone. It was found, however, that the potassium hydroxide pretreatment increased the absorbing capacity of the bone more than fourfold, as shown by the removal of 39.4% of the strontium activity from the milk passed through the second column.

*Example XVII*

The effectiveness of several contact methods and mesh sizes was evaluated in a series of milk treatments using anorganic bone as the absorber material. In each instance about 950 parts of radiostrontium milk was contacted with 9 to 10 parts of bone. In the first treatment the milk was stirred mechanically for 15 minutes with bone of 40–60 mesh size. It was found that 28.4% of the strontium activity was removed. In the next treatment the bone of 60–80 mesh size was shaken for 5 minutes. After one hour of standing a sample was taken which showed removal of 17.7% activity. A further sample was removed after 24 hours' standing and this showed removal of 19.4% activity. In the next treatment the milk was shaken for 5 minutes with bone of greater than 100 mesh size. After standing for one hour a sample was analyzed and showed removal of 24.8% strontium activity. After standing for 24 hours 27.6% activity had been removed. In a final treatment milk was passed through an absorber column as described in Examples XIII and XIV and this method of treatment resulted in removal of 43.4% of strontium activity.

Although the treatment of this invention has been described with particular reference to the removal of radioactivity from milk, it will be understood that the invention is not so limited. The same treatments are applicable with equal effect to other contaminated liquids, notably water, for consumption by humans and other animals, and other liquid foodstuffs. Exemplary of this latter group are juices expressed from the fruit of plants grown in soil contaminated by an accumulation of fallout, such as tomato juice, pineapple juice and the like, and liquids expressed from fruit grown on vines or trees growing in soil contaminated by fallout, such as grape juice, apple cider, orange juice and the like. In these instances the radioactivity is carried over to products made from the liquids, such as wines from grapes grown in soil subjected to fallout, as well as the grape juice itself.

In many instances the treatment of the liquid foodstuff may be carried on simultaneously with some other conventional processing step, such as mixing, blending, cooling, pasteurization, homogenization and the like. In this manner much duplication of processing time may be avoided.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A method for the reduction of the concentration of cationic radioactive strontium isotopes in liquid foodstuffs which comprises intimately contacting the liquid with a solid finely divided relatively insoluble calcium containing chemically modified naturally occuring mineral bone material possessing cationic exchange properties and then separating the liquid from the solid.

2. A method according to claim 1 further characterized in that said mineral material has particle sizes ranging from about 40 mesh to greater than 100 mesh.

3. A method according to claim 1 further characterized in that said solid mineral bone material is selected from the class consisting of anorganic bone and fat-free potassium hydroxide treated bone.

4. A method according to claim 3 further characterized in that said fat-free potassium hydroxide treated bone is regenerated after use for reuse by treatment with a solution of potassium hydroxide.

5. A method according to claim 1 further characterized in that said liquid foodstuff is milk.

6. A method according to claim 1 further characterized in that said liquid is brought into contact with said solid mineral by passage through an elongated column of the mineral.

7. A method according to claim 6 further characterized in that said solid mineral material is finely divided bone of the class consisting of anorganic bone and potassium hydroxide treated fat-free bone in the particle size range of about 40–80 mesh.

8. A method according to claim 1 further characterized in that said liquid is brought into contact with said solid mineral by agitation of a suspension of the mineral in the liquid.

9. A method according to claim 8 further characterized in that said solid mineral is suspended in said liquid in the proportion of about one part by weight of solid to each 2½ to 100 parts of liquid.

10. A method for the reduction of the concentration of cationic radiostrontium in milk which comprises intimately contacting the milk with a finely divided relatively insoluble calcium chemically modified containing naturally occurring mineral bone material possessing cationic exchange properties and fat-free potassium hydroxide treated bone and then separating the milk from the mineral.

11. A method according to claim 10 further characterized in that said milk is brought into contact with said mineral by passage through an elongated column of the mineral in the patricle size range of about 40–80 mesh.

References Cited in the file of this patent
UNITED STATES PATENTS 2,204,072 Dean _____ June 11, 1940
2,616,847 Ginell _____ Nov. 4, 1952

OTHER REFERENCES

Smith et al.: "Development and Use of the Bone Filter for Removing Fluorine From Drinking Water," published by University of Arizona, June 30, 1939, Tech. Bull. No. 81, pages 254–258.

Ind. & Eng. Chem., vol. 41, No. 3, March 1949, pages 457 to 459.

Calmon et al.: "Ion Exchange in Organic and Biochemistry," Interscience Publishers, Inc., N.Y., 1957, pages 202–206.

UNITED STATES PATENT OFFICE
CERTIFICATE OF CORRECTION

June 18, 1963

Patent No. 3,094,419

Leon Singer et al.

It is hereby certified that error appears in the above numbered patent requiring correction and that the said Letters Patent should read as corrected below.

Column 3, line 63, after "has" insert -- then --; column 6, line 45, for "reated" read -- treated --; line 50, for "he" read -- the --; column 8, line 73, after "calcium" insert -- containing --; same line 73, strike out "containing"; line 75, after "properties" insert -- selected from the class consisting of anorganic bone --.

Signed and sealed this 17th day of December 1963.

(SEAL)
Attest:
ERNEST W. SWIDER

Attesting Officer

EDWIN L. REYNOLDS

Acting Commissioner of Patents